METHOD OF SAMPLING

Filed July 17, 1962 2 Sheets-Sheet 1

IVAN C. GRUET INVENTOR

BY David A. Roth

PATENT ATTORNEY

IVAN C. GRUET INVENTOR

BY David A. Roth

PATENT ATTORNEY

United States Patent Office 3,264,456
Patented August 2, 1966

3,264,456
METHOD OF SAMPLING
Ivan C. Gruet, Montclair, N.J. assignor to Esso Research and Engineering Company, a corporation of Delaware
Filed July 17, 1962, Ser. No. 210,362
1 Claim. (Cl. 235—150.51)

This invention relates to either circuits, apparatus, or methods, any of which, or any combination of which, can be used with computers and similar devices to obtain solutions to problems. In particular, it relates to circuits which permit the sampling of calculated values of variables for use by computers and similar devices. Even more particularly, it relates to circuits which sample by tracking and holding point values of a calculated curve. These values are held until needed for use in a computer for further operation.

Computers can be very loosely grouped into two main classes, that is, analog computers and digital computers. This invention is primarily concerned with analog computers although in most analog computers, there are certain digital characteristics and vice versa. Analog computers can be divided into three main classes on the basis of the hardware components of the computer. These are the mechanical analog computers which are primarily general purpose computers, electromechanical analog computers which generally refer to computers which consist of motors, potentiometers, pen recorders, and the like, electronic computers, and combinations of the foregoing. Most analog computers fall into the electromechanical category except for the high speed, repetitive type of analog computers which are primarily electronic computers.

By electronic analog computer is meant a computer for solving differential equations in which most, if not all, of the computations are accomplished by purely electronic means. An electronic analog computer can repetitively solve a problem many times a second, for example, a typical one can repeat from 10 to 60 times per second.

A type of analog computer which is classified functionally, rather than by its hardware components, is a differential analyzer. There are differential analyzers which are either pure electronic or of the electromechanical type. The electromechanical type usually displays a solution graphically on an electromechanical plotter to produce a permanent record. The pure, or relatively pure, electronic differential analyzer is generally of the type mentioned above which produces a repetitive solution many times a second. This type of computer usually is employed in conjunction with a cathode ray oscilloscope to visually display the solution of the problem in all its changing aspects.

Since analog computers compute by means of electronic circuits which are analogs of the problem to be solved, it might be interesting to consider the analogs that can be used by a typical differential analyzer. For instance, quantity representation is usually by voltage. External links for input are usually cabling for logic and dial settings of a potentiometer for data. Output is usually a graphic presentation, i.e. recorder or oscilloscope. Coefficients of problems are introduced using set positions of potentiometers. Operations are performed mostly by the basic computing elements described above such as amplifiers and nonlinear components such as multipliers, dividers, and the like.

Although the invention is broadly applicable to all classes of computers, it is particularly applicable to general purpose computers and differential analyzers, especially electronic or electromechanical differential analyzers. These analyzers by their very nature are composed of mechanical or electrical, preferably electronic, circuits which integrate so as to solve differential equations.

An analog computer can also be referred to as a simulator. A variable will be kept in a direct relationship with other variables during the time of problem solution.

The invention is most advantageously used in connection with a general purpose analog computer which is usually of the electronic analog type. This type of computer can perform continuous integrations or differentiations as well as any of the other basic mathematical operations. The basic computing elements of a typical general purpose analog computer are electronic analogs of mathematical blocks.

Most computations can be accomplished by combining in the proper way these basic computing elements. For example:

To generate the time integral of a variable an integrating amplifier is used.
To simulate the behavior of variables a function generator is used.
To multiply variable electronic or servo multipliers are used.
To add or subtract variables summing amplifiers are used.
To multiply a variable by a constant attenuators are used.

The basic computing elements are well known to the art and need not be described herein in further detail. Each of the electronic analogs of a mathematical block has input and output terminals. These terminals are consolidated in one area on the computer by means of a removable patch panel. These patch panels are then properly plugged up with patch cords, preferably when removed from the computer. The patch panel when plugged with patch cords is then attached to the computer. This hooks up the proper terminals.

In most practical applications of computers, e.g. general purpose analog computers, a particular problem is reduced to mathematical expressions involving differential equations. Next, the expressions are converted to an electronic circuit diagram. This diagram serves as a guide to patch the board and hence indirectly program the computer. Entry of coefficients is accomplished by setting potentiometers. The computer acts on the electronic circuit using the entered constants and/or parameters to give the desired answers. These answers are usually either point values readable on a voltmeter following selection of any standard analog component block output or, more likely, as lines on a chart or traces on an oscilloscope.

Using the sampling technique of the invention it is possible to store point values and subsequently plot on recording equipment point values of these profiles. Since each point on a particular curve has a different stored location (i.e. a different value for its abscissa), a slow and continuous change of the stored location in a particular direction will yield essentially a slow scanning of the particular profile which can then be plotted from the output of the storage device. Simultaneous sampling circuits would therefore permit simultaneous plotting without disrupting the particular mode of calculation (i.e. repetitive operation).

Many process simulations require as an integral part of the overall simulation, solutions to heat transfer and mass transfer problems. These problems are usually expressed in terms of sets of partial differential equations or multidimensional moving boundary value problems. To solve these equations with the techniques available to date, storage of point values is necessary. Since no memory units are available on a general purpose analog computer, the sampling technique of the invention is of significant use if these problems are to be solved on a general purpose analog computer. The fact that the technique of the invention is programmable and uses little equipment makes it even more attractive.

Control devices employing analog computing devices or even plain electrical, electronic or electro-mechanical packages can use this sampling technique to calculate electrical error signals to be fed either directly or through appropriate convertors to controlling units. This application can be useful both in process control simulations using analog computers or in plant control using in-plant computers or special devices as outlined above.

Thus the circuit apparatus and method of the invention as is described herein will permit the sampling of calculated values of variables on, say, a general purpose analog computer or any electrical, electronic, or electro-mechanical devices. The sampling can occur at any value of either the dependent or independent variable and is accomplished by means of a track-and-hold technique.

In brief, the technique of the invention involves the triggering of switches, e.g. diodes to command a circuit or a series of circuits to track and hold the desired sample value or values at the particular desired condition or conditions.

In a preferred embodiment of the invention tracking is carried out by using resistances and capacitances in parallel at the input of a high gain amplifier with equivalent parallel circuits in the feedback of the high gain amplifier. The hold position is obtained by disconnecting all inputs to the resistors, capacitors and high gain amplifier, thus resulting in an amplifier circuit with the desired stored value in the capacitor of the circuit.

Thus an object of the invention is to provide for the sampling of point values on a calculated curve. An additional object is to accomplish the sampling of point values on a calculated curve by a tracking and holding technique.

Other objects and a fuller understanding of the invention may be had by referring to the following description and claims taken in conjunction with the accompanying drawing in which:

Figure 1:
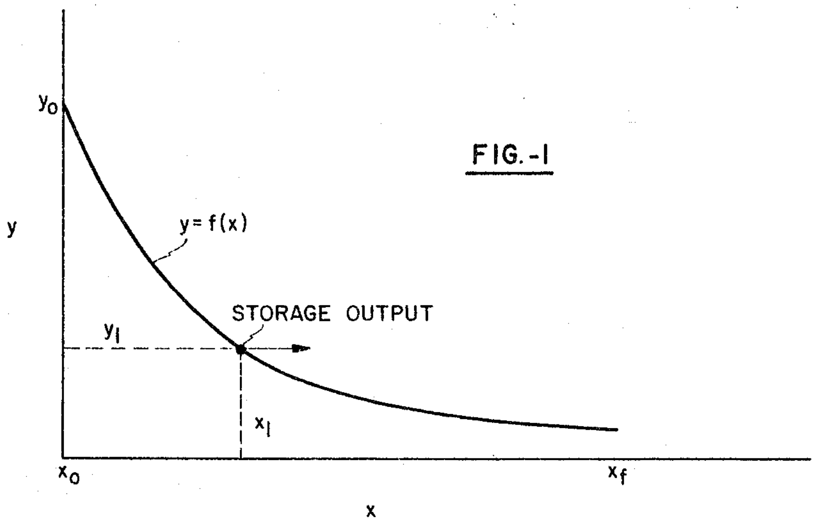
FIGURE 1 shows a graph of a typical curve of the function $y=f(x)$.
Figure 2:
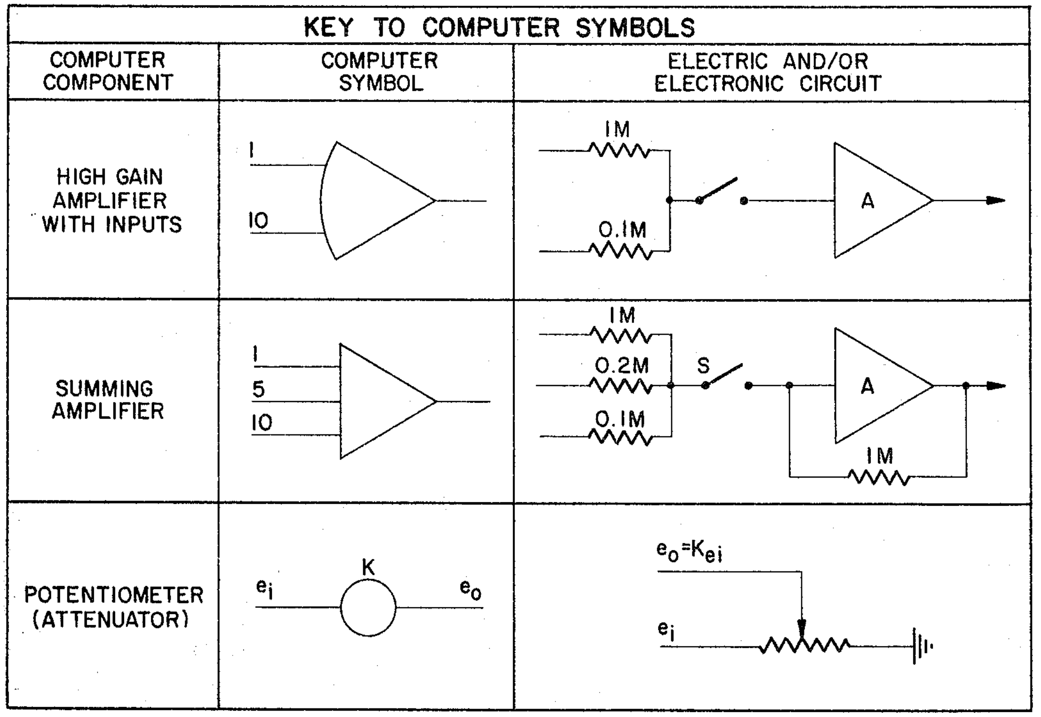
FIGURE 2 shows a Key to Computer Symbols.

The invention will be further understood by the specific embodiment which follows. FIGURE 1 which is a graph of the function $y=f(x)$ is now referred to. The technique of the invention will enable the sampling and holding of $y=y_1 @ x=x_1$. Assuming that $x$ varies from $x_o$ to $x_f$, $x_1$ will be a value somewhere within the range of variation of $x$, that is $x_o \leq x_1 \leq x_f$. Similarly, $y$ will vary from $y_o$ to $y_f$ and $y_1$ will be a value in the range of variation of $y$, that is $y_o \leq y_1 \leq y_f$. Assume, for example, that it is desired to store the value $y_1$. In that instance the circuit must continuously scan $y=f(x)$ as $x$ varies from $x_o$ to $x_1$. This continuous scanning will be referred to herein as the "tracking mode." The tracking mode generates a continuous succession of $y$ values. Out of this large number of $y$ values $y_1$ must be selected when $x=x_1$. This is accomplished by a switching mechanism. Then finally $y_1$ must be held for further use. This holding is referred to herein as the "holding mode."

Figure 3:
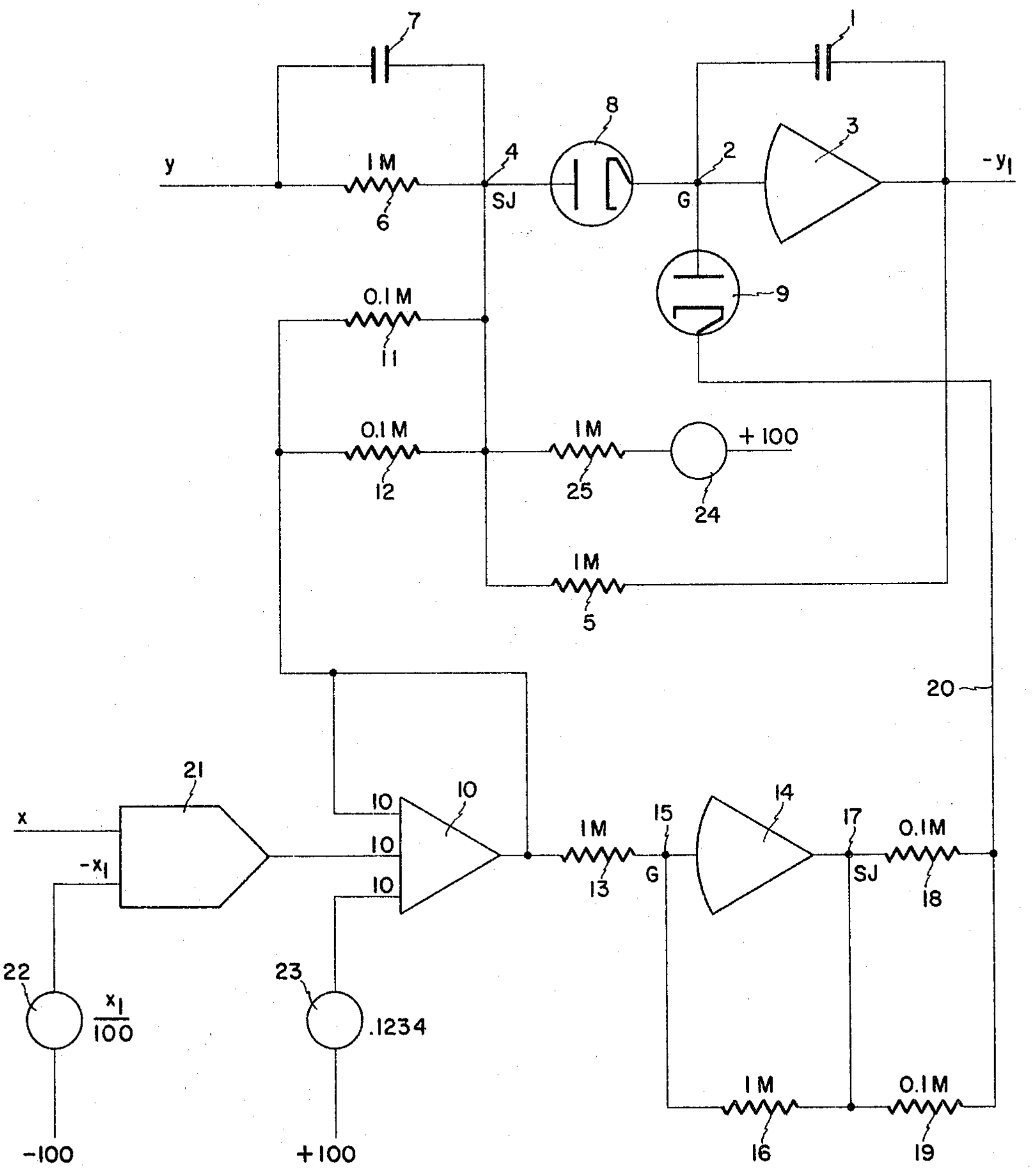
FIGURE 3 shows the circuit elements and their arrangement in a specific embodiment of a track-and-hold circuit.

FIGURE 3 is now referred to. In FIGURE 3 a capacitor 1 is connected between the grid point 2 and the output of high gain amplifier 3. To enable storing to take place in this circuit the capacitor is charged and then retains the charge it has when the circuit is opened.

The summing junction (SJ) 4 of amplifier 3 is connected to the grid point (G) 2 of amplifier 3 through diode 8. A 1-megohm resistor 5 is in parallel to capacitor 1. If resistor 5 is not present in such parallel arrangement the combination of amplifier 3 and condenser 1 will behave as an integrator. Input resistor 6 (1 megohm) is in series with summing junction (SJ) 4. A capacitor 7 is placed in parallel with input resistor 6 to form an RC network to compensate for lag created by the feedback RC network of resistor 5 and capacitor 1. When the time constants of both RC circuits are equal there will be no lag and equal compensation, that is equal lead and lag, will be obtained. Thus, when the product of resistor 6 and capacitor 7 equals that of resistor 5 and capacitor 1, the time constants are equal.

If, at the same time resistor 6 is equal to resistor 5, then capacitor 1 is equal to capacitor 7 and amplifier 3 will behave as a sign changer.

In the circuit of this specific embodiment of the invention resistor 6 and resistor 5 are 1 megohm each and capacitor 1 and capacitor 7 are each .01$\mu$f.

To hold, i.e. freeze, a charge in capacitor 1, the inputs to the circuit comprising capacitor 1, and amplifier 3 must be disconnected. This can be accomplished by disconnecting summing junction (SJ) 4 from the grid point (G) 2 of amplifier 3. When this occurs amplifier 3 behaves as an integrator with no input. Therefore its output is a constant which is equal to $y_1$ when the electrical connection between (SJ) 4 and grid point (G) 2 is opened at $x=x_1$.

The specific embodiment of the invention being described is being disclosed with respect to the 231 R PACE Analog Computer manufactured by Electronic Associates, Inc., Long Branch, New Jersey. This computer is a general purpose computer which means that it is in essence a repetitive operation type computer. In such a repetitive operation computer some method must be provided so that very fast switching takes place. Therefore, for the purposes of this specific embodiment diodes are used to provide such fast switching. By switching it is meant the opening and closing of the electrical connection between summing junction (SJ) 4 and grid point (G) 2.

Instead of a switch between (SJ) 4 and grid point (G) 2 of amplifier 3 there is a diode 8. Another diode 9 is also connected to grid point (G) 2 of amplifier 3. The output of summing amplifier 10 is connected between summing junction (SJ) 4 and resistor 5 by means of two parallel .1 megohm input resistors 11 and 12. The output from amplifier 10 is also supplied to 1 megohm resistor 13 which then goes into amplifier 14 by way of grid point (G) 15 of amplifier 14. High gain amplifier 14 is provided with a feedback 1 megohm resistor 16 which is in parallel with amplifier 14 and connected to grid point 15 of amplifier 14 and summing junction (SJ) 17 of amplifier 14. The output from summing junction (SJ) 17 and resistor 16 flows through parallel .1 megohm resistors 18 and 19 through wire 20 to diode 9.

Looking now at diode 8 it can be seen that diode 8 is so arranged that it will conduct only when a positive voltage is available at the output of amplifier 10 regardless of the polarity of $y$. This holds true since $y$ is applied to a 1 megohm resistor giving it a gain of 1 while the output of amplifier 10 which is +12 volts goes through two parallel .1 megohm resistors 11 and 12 giving it a gain of 20 as compared to gain of one for the input quantity $y$.

Diode 9 is used as a compensating diode at grid point (G) 2 of amplifier 3 to remove the bias voltage that has been added to the value of $y$ to make diode 8 conduct. The output of amplifier 10 is changed in sign by amplifier 14 and, in turn, sent through resistors 18 and 19 and then through line 20 to the grid of diode 9. Since the grid of diode 9 must have a negative voltage at the same time the plate of diode 8 has a positive voltage, diode 9 will conduct simultaneously with diode 8.

To provide the proper voltage at the output of amplifier 10 a square wave generating circuit is needed. Amplifier 10 is selected so that its output will be approximately 12 volts in magnitude. The polarity of the 12 volts will be dependent on the instantaneous value of $x$, i.e. whether lower or greater than $x_1$. The use of a 12 volt square wave pulse at the output of amplifier 10 will give a fast acceptable switching. This was arrived at empirically.

To generate the square wave a comparator 21 is used. This can be any standard polarity changing device. Comparator 21 receives the input $x$ signal and a $-x_1$ signal from potentiometer 22 which is set at $x_1/100$ so that the potentiometer 21 output is $-x_1$ when a negative 100 volts is fed into it. The $-x_1$ output from potentiometer 22 is then directed into comparator 21. The square wave signal from comparator 21 is not symmetrical with respect to zero voltage. It is therefore biased by attaching potentiometer 23 to the input of amplifier 10. A +100 voltage is fed into potentiometer 23 which is set at 0.1234. This setting for potentiometer 23 is an empirically derived figure which is to be used with this particular specific embodiment.

When $x$ varies from $x_0$ to $x_1$ the signal will be positive at the output of amplifier 10. Diodes 8 and 9 will then conduct and amplifier 3 will track. When $x$ varies from $x_1$ to $x_f$ the signal will be negative at the output of amplifier 10. Neither diode 8 nor diode 9 will conduct and amplifier 3 and condenser 1 will be in the holding mode. Amplifier 10 is also provided with an extra feedback gain of 10 to obtain the 12 volt square wave pulse.

Potentiometer 24 is inserted between resistor 5 and summing junction (SJ) 4 through 1 megohm resistor 25. A positive 100 volts is fed into potentiometer 24 in order to compensate for differences due to unmatched diodes 8 and 9. In operation it is adjusted with amplifier 3 in the tracking mode with a 0 input instead of a $y$ input until 0 output is obtained. Once a proper potentiometer 24 setting is obtained, it will not interfere with the operation of the circuit.

As mentioned above, this specific embodiment is shown in its relationship with the general purpose PACE 231 R Analog Computer manufactured by Electronic Associates. In such a computer the output from a comparator 21 and potentiometer 22 circuit is available at the $-J$ patch panel pin. Because extremely rapid switching is desired the mechanical relay of the comparator is bypassed in favor of a direct tap connection to the coil of comparator 21 of the PACE Analog Computer.

It should be observed that at low speed operation a relay can be used to disconnect and connect (SJ) 4 from grid point (G) of amplifier 3 thus storing or holding the desired value. For instance a polarized relay could be used in place of the diodes. A polarized relay is a relay in which there is a permanent flux, generally sustained by a permanent magnet, which makes the operation depend on the polarity of the current.

Although the foregoing invention has been described with a certain degree of particularity, it will be understood that the present disclosure has been made only by way of example and that numerous changes in the details of construction, combination, circuit elements and arrangement of parts can be resorted to without departing from the spirit and scope of the invention as hereinafter claimed.

What is claimed is:

Apparatus for sampling a value on a calculated curve comprising in combination:

(a) track-and-hold means comprising
  (1) a capacitor
  (2) an amplifier in parallel connection with said capacitor (b) a pair of diodes used as switches for regulating the application of current to said track-and-hold means (c) a circuit to compensate for time lag consisting of a capacitor and resistor in parallel for applying a voltage proportional to a series of values to said track-and-hold means said voltage passing through one of said diodes before going to said track-and-hold means (d) means for generating a square wave which changes in polarity at any predetermined value, said change in polarity causing actuation of said pair of diodes.

References Cited by the Examiner

UNITED STATES PATENTS

| | | | |
|---|---|---|---|
| 2,789,761 | 4/1957 | Merrill et al. | 235—183 X |
| 2,962,217 | 11/1960 | Landsman | 235—197 |
| 2,985,838 | 5/1961 | Cole et al. | 328—121 |
| 3,050,673 | 8/1962 | Widmer | 320—1 |

MALCOLM A. MORRISON, *Primary Examiner.*

K. W. DOBYNS, *Assistant Examiner.*